United States Patent
Kaplan et al.

(12)

(10) Patent No.: US 6,717,312 B1
(45) Date of Patent: Apr. 6, 2004

(54) DEFENSE VEHICLE AIMING ORDINANCE PLATFORM HAVING VARIABLE RELUCTANCE MOTOR

(75) Inventors: Martin Kaplan, Avon, CT (US); Peter Senak, Jr., Bristol, CT (US)

(73) Assignee: Dana Corporation, Toledo, OH (US)

(*) Notice: Subject to any disclaimer, the term of this patent is extended or adjusted under 35 U.S.C. 154(b) by 0 days.

(21) Appl. No.: 09/753,815

(22) Filed: Jan. 3, 2001

(51) Int. Cl.[7] .................. H02K 5/00; H02K 11/00; H02K 7/00; H02K 1/12; H02K 1/22
(52) U.S. Cl. .................. 310/91; 310/66; 310/254; 310/261; 310/40 R
(58) Field of Search ................. 310/261, 254, 310/91, 66, 40 R, 10

(56) References Cited

U.S. PATENT DOCUMENTS

| | | | |
|---|---|---|---|
| 1,551,347 A | | 8/1925 | Trombetta |
| 3,081,624 A | * | 3/1963 | Mayer ................. 73/862.328 |
| 3,469,124 A | * | 9/1969 | Willcox ................ 310/49 R |
| 3,603,826 A | * | 9/1971 | Saretzky ................ 310/266 |
| 3,708,251 A | | 1/1973 | Pierro ................. 417/356 |
| 3,714,480 A | * | 1/1973 | Apsit et al. ............. 310/170 |
| 3,851,199 A | * | 11/1974 | Apsit et al. ............. 310/168 |
| 3,864,588 A | * | 2/1975 | Inaba ................. 310/266 |
| 3,970,907 A | * | 7/1976 | Meyers ................ 318/755 |
| 4,021,015 A | | 5/1977 | Maeder et al. ........... 251/133 |
| 4,059,780 A | | 11/1977 | Mazuir ................ 310/164 |
| 4,081,703 A | * | 3/1978 | Madsen et al. .......... 310/49 R |
| 4,234,808 A | * | 11/1980 | Geppert et al. .......... 310/49 R |
| 4,268,769 A | | 5/1981 | Dorner et al. .......... 310/67 R |
| 4,574,211 A | * | 3/1986 | Muller et al. .......... 310/68 R |
| 4,634,906 A | | 1/1987 | Grosjean ............. 310/49 R |
| 4,714,853 A | | 12/1987 | Palmero et al. .......... 310/257 |
| 4,719,378 A | | 1/1988 | Katsuma et al. ......... 310/67 R |
| 4,763,050 A | * | 8/1988 | Ruppert ............. 318/254 |
| 4,764,697 A | * | 8/1988 | Christiaens ............ 310/49 R |
| 4,772,815 A | | 9/1988 | Harned et al. .......... 310/171 |
| 4,794,286 A | | 12/1988 | Taenzer ............... 310/12 |
| 4,833,873 A | * | 5/1989 | Kobayashi et al. ......... 57/100 |
| 4,920,294 A | * | 4/1990 | Christiaens et al. ........ 310/162 |
| 4,949,000 A | * | 8/1990 | Petersen .............. 310/179 |
| 5,038,066 A | | 8/1991 | Pawlak et al. .......... 310/263 |
| 5,053,666 A | * | 10/1991 | Kliman et al. .......... 310/261 |
| 5,155,402 A | * | 10/1992 | Bichler .............. 310/90.5 |
| 5,180,940 A | * | 1/1993 | Paratte et al. ......... 310/40 MM |
| 5,396,140 A | * | 3/1995 | Goldie et al. .......... 310/268 |
| 5,481,146 A | * | 1/1996 | Davey ............... 310/90.5 |
| 5,495,131 A | * | 2/1996 | Goldie et al. ........... 310/12 |
| 5,500,780 A | * | 3/1996 | Boutaghou et al. ...... 360/99.08 |
| 5,670,837 A | * | 9/1997 | Boutaghou et al. ........ 310/184 |
| 6,177,746 B1 | * | 1/2001 | Tupper et al. .......... 310/166 |
| 6,344,946 B1 | * | 2/2002 | Papst ............... 360/99.08 |

FOREIGN PATENT DOCUMENTS

WO    WO-91/09449    *  6/1991

* cited by examiner

Primary Examiner—Nestor Ramirez
Assistant Examiner—Pedro J. Cuevas
(74) Attorney, Agent, or Firm—Dykema Gossett PLLC

(57) ABSTRACT

An ordinance platform with a variable reluctance electric motor is provided. The motor has a stator integrated with a bearing race which is fixably connected with the tank body. The bearing race provides the function of a rotor and is fixably or integrally connected with the tank turret. The rotor is vertically supported by the stator for rotational movement by a plurality of ball bearings. The stator is formed having a plurality of individual phase segments which are arranged in an annular array. Each of the stator phase segments is provided with a phase winding and a plurality of stator pole teeth. The stator phase windings are connected individually to respective driver circuits so as to essentially create a plurality of individual stators about the rotor. The rotor race is formed and is provided with a plurality of rotor pole teeth which are disposed adjacent the stator pole teeth. Thus, when the phase windings of the individual stator phase segments are energized, the moveable race (integrated with the rotor and connected with the gun turret) is rotated relative to the stationary race (integrated with a stator and connected with the tank body), without any intermediate coupling device such as gears, belts and the like.

24 Claims, 4 Drawing Sheets

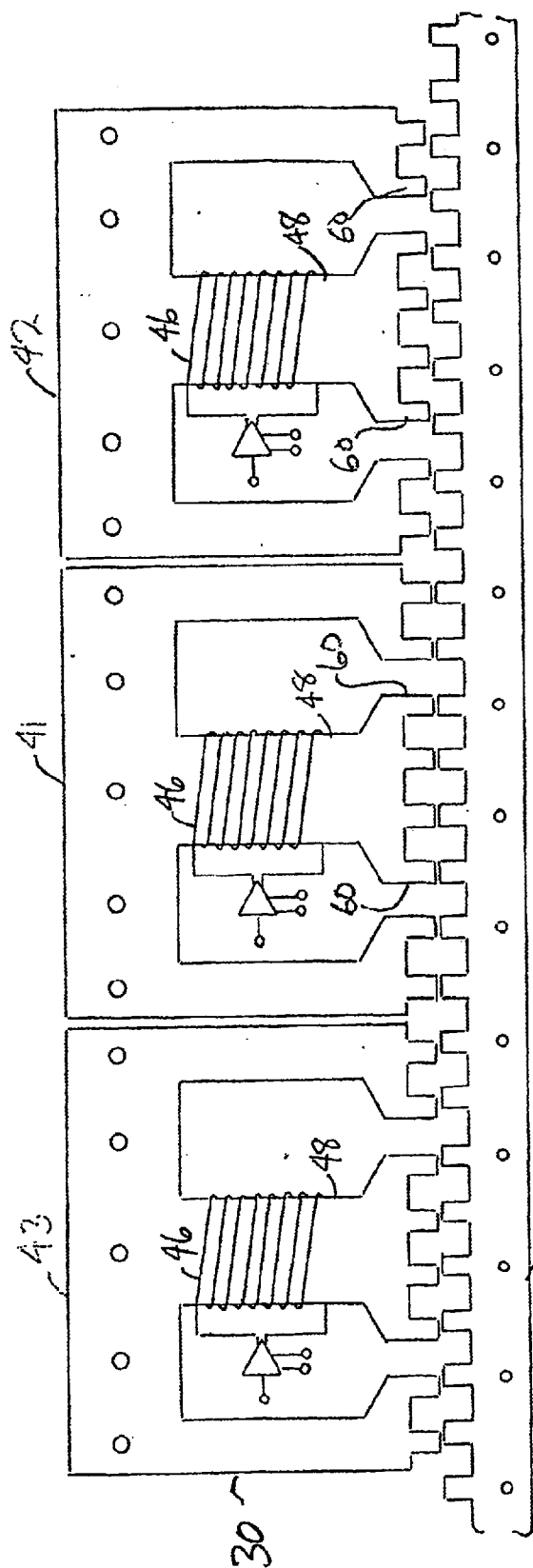

DEFENSE VEHICLE AIMING ORDINANCE PLATFORM HAVING VARIABLE RELUCTANCE MOTOR

FIELD OF THE INVENTION

The field of the present invention is that of electric motors. More particularly the field of the present invention is that of electric motors which are suitable for utilization in the aiming of defense vehicle ordinance platforms such as tank turrets and helicopter machine gun turrets.

BACKGROUND OF THE INVENTION

In the prior art shown in FIG. 3, many defense vehicles such as tanks have a gun turret 13 which is rotatably mounted to a main body 15 of the tank vehicle. To rotate the turret 13 there is provided an annular member 17 having gear teeth along its interior diameter. The annular member is fixably connected with the tank main body 15. A motor 11 is connected with the turret 13. The motor has an extending shaft 19 with a gear 21 at its end which is meshed with the gear teeth of the annular member 17. Energization of the motor causes the turret 13 to be rotated about the tank main body 15.

Ordinance platforms in defense equipment such as the aforementioned tank turret or helicopter machine gun turrets must meet stringent operational specifications. The ordinance platform must be able to turn rapidly with minimum backlash or overshoot. The ordinance platform must be able to support considerable weight from the ordinance device and from armor cladding. Additionally, the ordinance platform must be able to stand up against the shock loading which comes from the firing of the ordinance. In many instances the ordinance platform must have a large central opening to allow for central delivery of ammunition to the ordinance device. The operation of the ordinance platform must be highly reliable in the most hostile of environmental and operating conditions. The required parts for the ordinance platform should be held to a minimum. Additionally, the weight of the ordinance platform, especially when utilized in conjunction with helicopters should be held to a minimum.

It is highly desirable to provide an ordinance platform with a reduced number of moving parts. It is also highly desirable to provide an ordinance platform which is sufficiently durable but yet is very light in weight. It is also desirable to provide an ordinance platform which brings forth opportunities for enhanced performance,

SUMMARY OF THE INVENTION

The present invention relates to an improved ordinance platform. The improved ordinance platform provides a structure wherein a variable reluctance electric motor has a stator integrated with a bearing race which is fixably connected with the tank body. The bearing race provides the function of a rotor and is fixably or integrally connected with the tank turret. The rotor race is vertically supported by the stator race for rotational movement by a plurality of ball bearings. The stator is formed having a plurality of individual phase segments which are arranged in an annular array. Each of the stator phase segments is provided with a phase winding and a plurality of stator pole teeth. The stator phase windings are connected individually to respective driver circuits so as to essentially create a plurality of individual stators about the rotor. The rotor race is formed and is provided with a plurality of rotor pole teeth which are disposed adjacent the stator pole teeth. Thus, when the phase windings of the individual stator phase segments are energized, the movable race (integrated with the rotor and connected with the gun turret) is rotated relative to the stationary race (integrated with the stator and connected with the tank body), without any intermediate coupling device such as gears, belts and the like. The stator and the rotor may be arranged to provide a single air gap or a double air gap therebetween, and the stator is located outside the rotor.

It is an object of the present invention to provide a variable reluctance electric motor. It is also an object of the present invention to provide a variable reluctance electric motor having a stator integrated with a first race of a bearing combination and for the rotor to be integral with the second race of a bearing. It is an object of the present invention to provide an ordinance platform. It Is another object of the present invention to provide an ordinance platform which incorporates a variable reluctance motor wherein the rotor of the motor is integral with a bearing race. It is a further object of the present invention to provide a variable reluctance motor for an ordinance platform afore described having a vertical gap between pole teeth of the stator and the rotor. It is a further object of the present invention to provide an ordinance platform with a variable reluctance motor with a vertical gap between the pole teeth of the stator and the rotor wherein there are two vertical gaps between the stator and the rotor.

The above noted objects will become more apparent to those skilled in the art as the invention is further explained in the accompanying detailed description and drawings.

BRIEF DESCRIPTION OF THE DRAWINGS

FIG. 6 is an electrical diagram with the motor laid out showing the various phase segments of the stator rotor and also illustrating the pole teeth of the stator and the pole teeth of the rotor.

FIG. 7 is a view taken along lines 7—7 of FIG. 4 illustrating the single vertical gap between the pole teeth of the stator and the pole teeth of the rotor.

FIG. 9 is a view taken along lines 9—9 of FIG. 8, illustrating the gaps between the pole teeth of the rotor and the pole teeth of the stator.

DETAILED DESCRIPTION OF THE DRAWINGS

Figure 2:
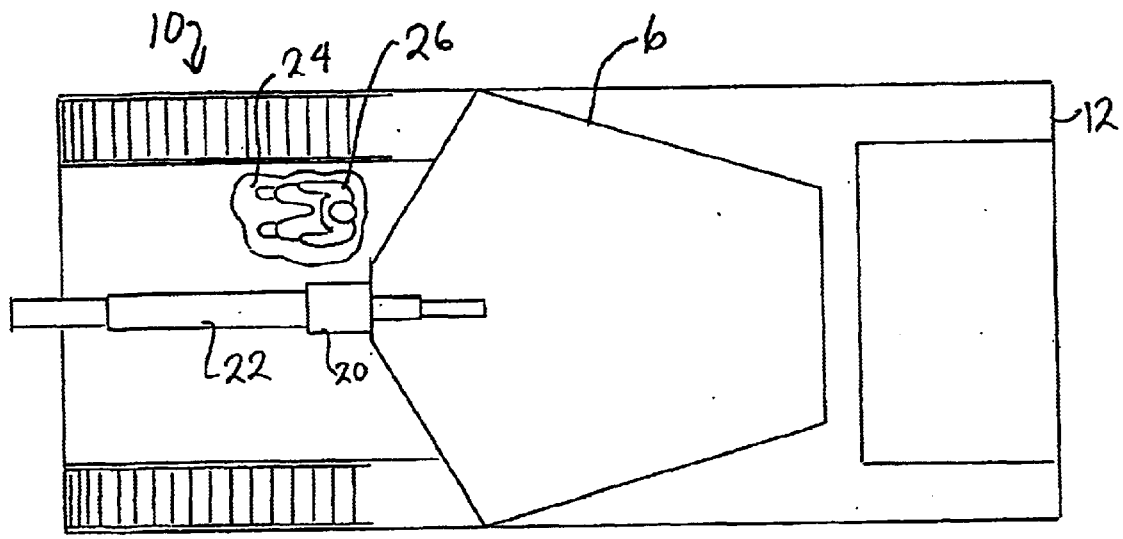
FIG. 2 is a top view of the vehicle tank shown in FIG. 1.
Figure 1:
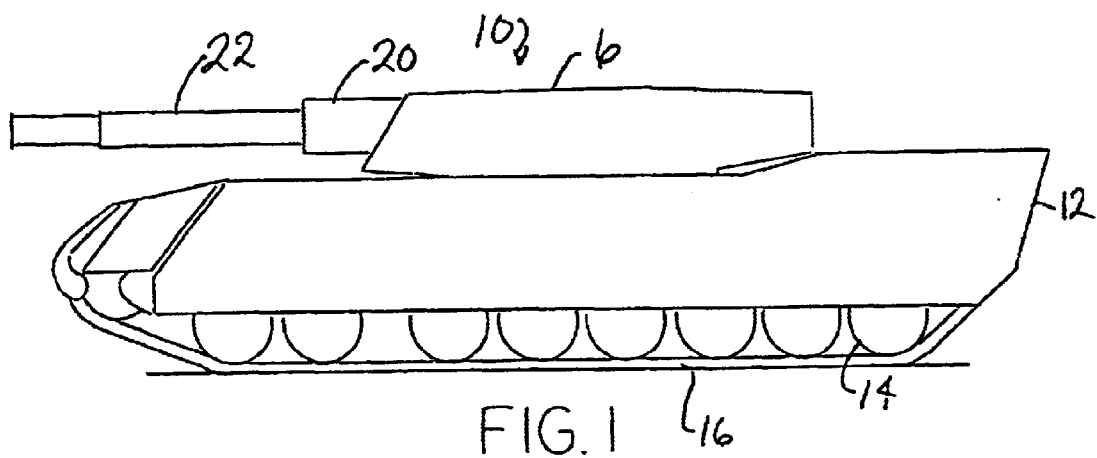
FIG. 1 is a side elevational view of a army tank illustrating a gun turret which is rotatably mounted on top of a tank body with a forward projecting multi-barrel gun.
Figure 3:
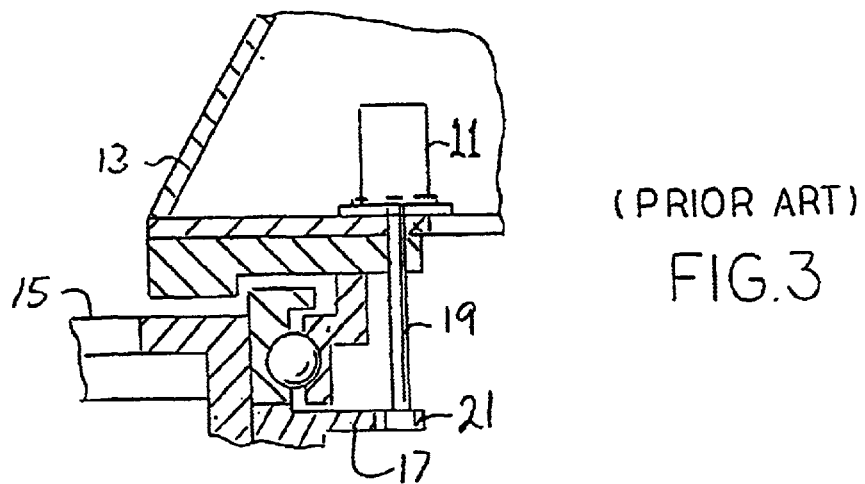
FIG. 3 illustrates a prior art arrangement for turning the gun turret of the tank upon the tank body.
Figure 4:
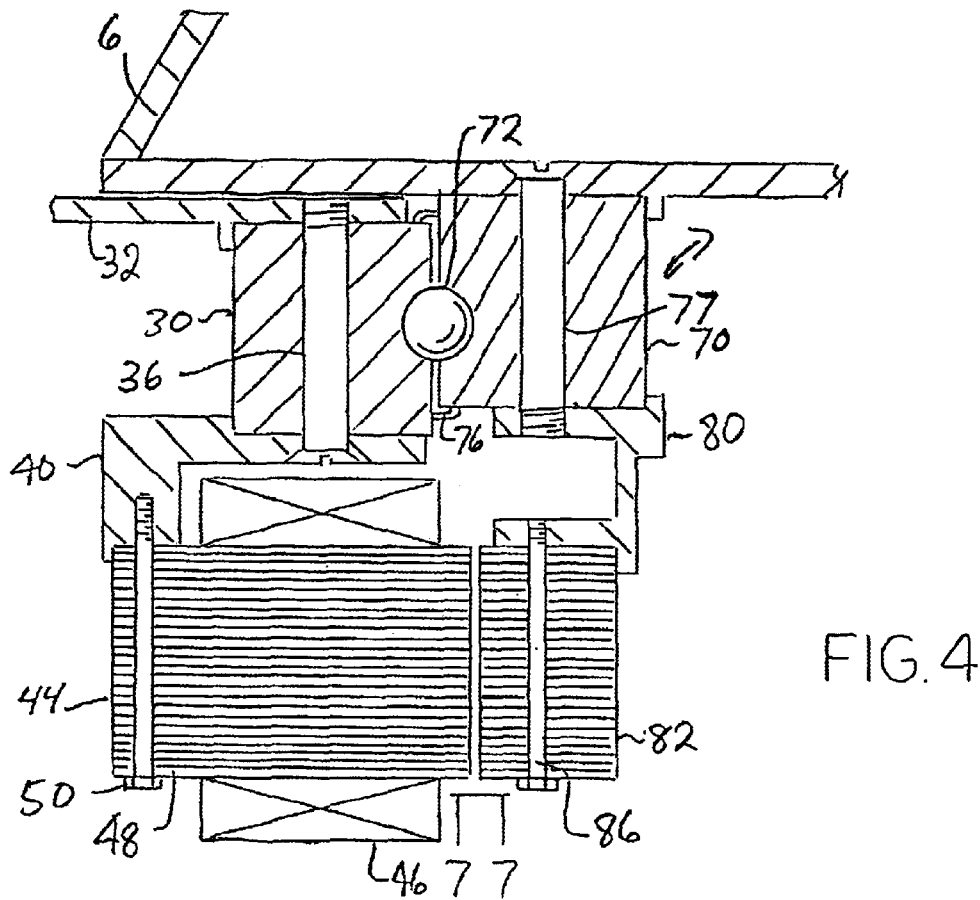
FIG. 4 illustrates a preferred first embodiment of the present invention providing a reluctance electric motor being utilized to turn the turret of the tank upon the tank body.
Figure 5:
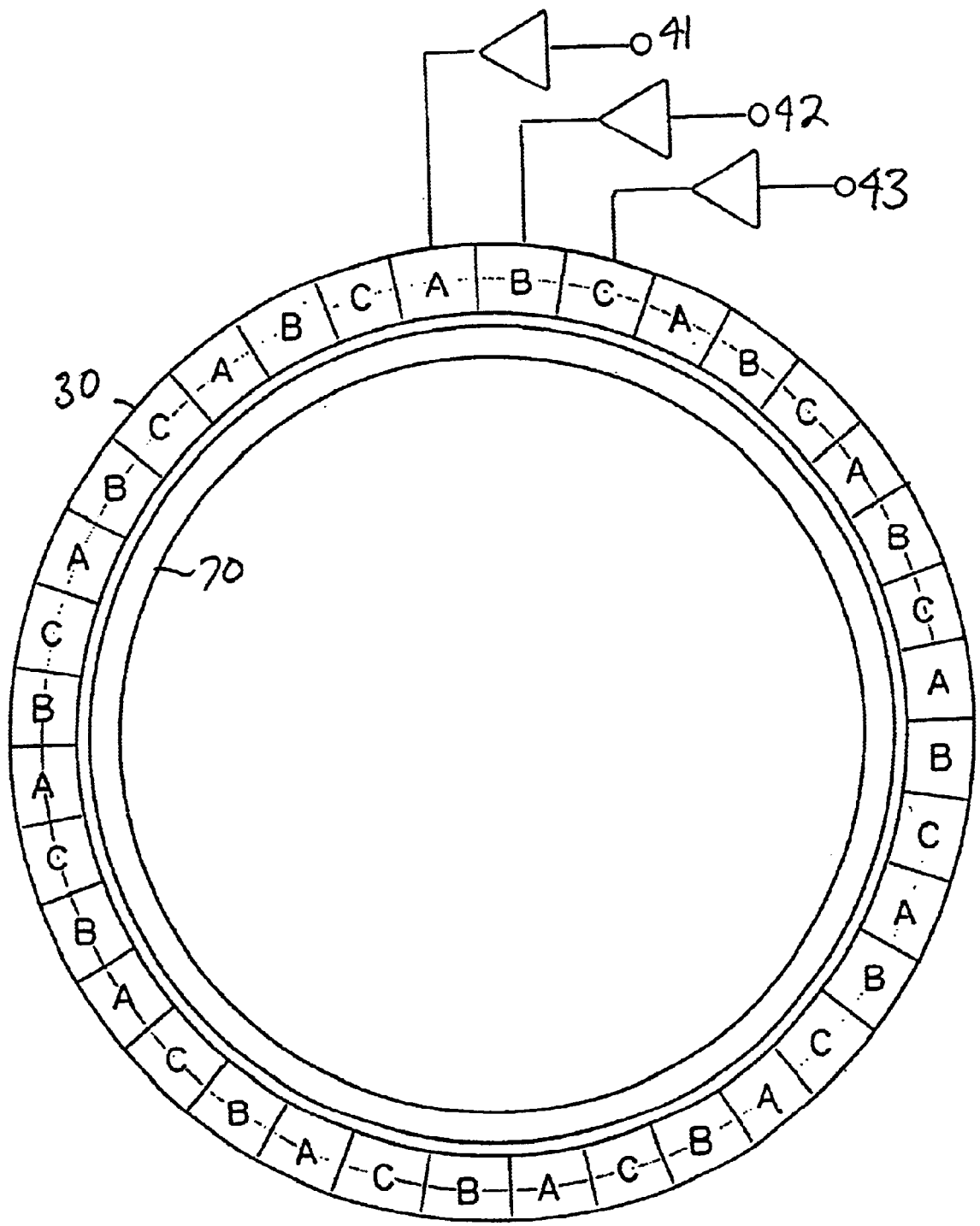
FIG. 5 illustrates an electrical diagram illustrating the construction of the stator rotor segments for the electric motor illustrated in FIG. 4.

Referring to FIGS. 1 and 2, a tank 10 has a main body 12. Operatively associated with the main body 12 is a series of chain wheels 14. The chain wheels 14 are meshed with a driving chain 16. A turret 6 is rotatably mounted upon the tank body 12. The turret carries a gun 20 with a multiple piece barrel 22. A forward interior compartment or trough 24 accommodates a driver 26. To rotate the turret 6 upon the tank body 12 there is provided a variable reluctance motor 7 (FIG. 4). The variable reluctance motor 7 has a stator bearing race 30. The stator bearing race 30 is connected with the hull 32 of the tank body by a threaded fastener such as bolt 36. The bolt 36 also connects a suspension hanger 40 with the stator race 30. The suspension hanger 40 suspends a stator phase segment 44 vertically underneath the stator race 30. The stator phase segment 44 has a coil 46 which is wound about a laminated core 48. The laminated core 48 is connected with the hanger 40 by a bolt 50. Referring additionally to FIGS. 5 and 6, the stator is made up by a plurality of segments 41, 42, 43. Each phase segment has its own coil winding 46 and laminated core 48. Each individual phase segment has a series of pole teeth 60 which project in a generally radial direction.

The stator bearing race 30 has rotatably mounted thereto a rotor bearing race 70. The rotor bearing race 70 is vertically supported by the stator race 30 by a plurality of s bearing members. In the example shown in FIG. 4, the bearing members are roller bearings or ball bearings 72. Between the rotor race 70 and the surrounding stator race 30 are bearing seals 76 which keep grease in for lubrication and seal the bearing from dirt, dust or other contaminants. The rotor race 70 is fixably connected with the gun turret 6 by a bolt 77. The bolt 77 also connects a hanger 80 with the rotor race 70. The hanger 80 suspends vertically underneath the rotor bearing race 70 a rotor core 82. The rotor core 82 is also laminated like the stator core 48. The rotor core 82 is connected with the hanger 40 by a threaded fastener as illustrated by a bolt 86. The rotor has a series of pole teeth 88 which are positioned adjacent to the pole teeth 60 of the stator and are separated from each other by a gap 92, as best shown in FIG. 7.

Figure 8:
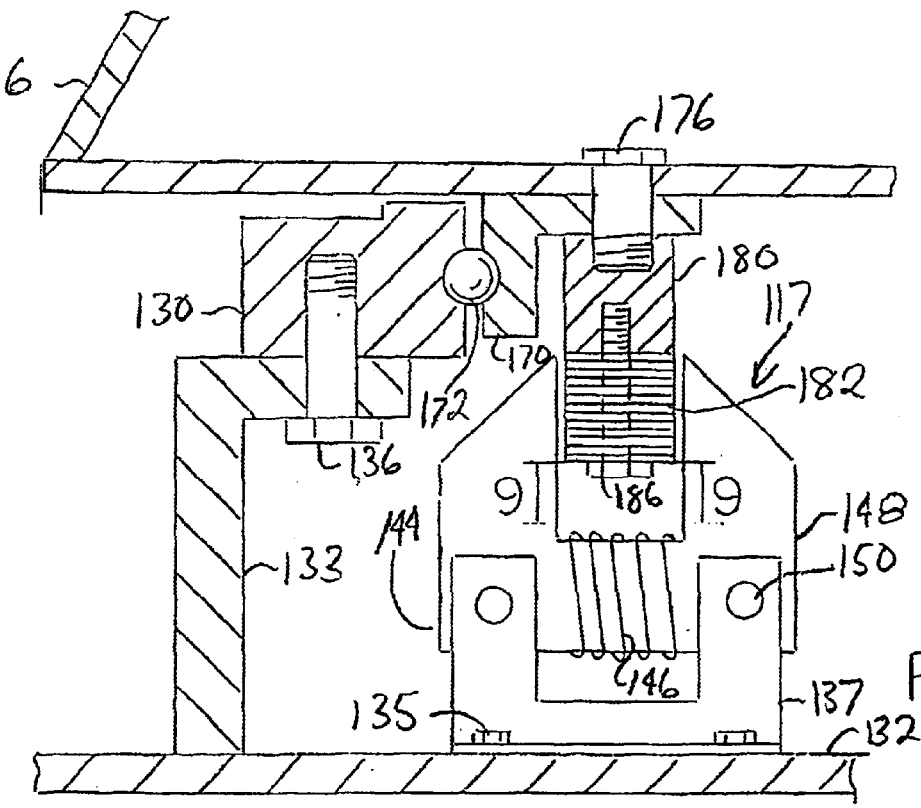
FIG. 8 illustrates an alternate preferred embodiment of the present invention illustrating a variable reluctance motor which has a stator with two vertical gaps with the stator pole teeth of the rotor.

Referring additionally to FIG. 8, a tank turret 6 which is very similar if not identical to the afore described tank turret 6 is aimed by an alternate preferred embodiment variable reluctance motor 117. The variable reluctance motor 117 has a stator bearing race 130. The stator bearing race 130 is connected with the hull 132 of the tank body by a threaded fastener such as bolt 136 via a bracket 133. Fixably mounted on top of the hull 132 by bolts 135 is a U-shaped stand 137. The stator phase element 144 has a coil 146 which is wound about a U-shaped laminated core 148. The laminated core 148 is connected with the stand 137 by pins 150. Referring additionally to FIGS. 5 and 6, the stator is made up by a plurality of phase segments. As mentioned previously, each phase segment has its own coil winding and core. Each individual phase segment has a series of pole teeth which project in a generally radial direction.

The stator bearing race 130 has rotatably mounted thereto a rotor bearing race 170. The rotor bearing race 170 is vertically supported by the stator race 130 by a plurality of bearing members. In the example shown in FIG. 8, the bearing members are ball bearings 172. The rotor race 170 is fixably connected with the gun turret 6 by a series of bolts 176. The bolts 176 also connect with the rotor race 170 a hanger 180. The hanger 180 suspends vertically underneath the bearing race 170 a rotor core 182. The rotor core 182 is also laminated like the stator core 148. The rotor core 182 is connected with the hanger 180 by a threaded fastener as illustrated by a bolt 186.

Referring additionally to FIG. 9, the stator laminated core 148 has pole teeth 160 which are separated from pole teeth 188 of the rotor core 182 by two vertically extending concentric annular gaps 192.

To rotate the gun turret 6, the coils 146 are energized and the turret 6 will rotate to a desired angular position with respect to the tank body 12.

While particular embodiments of this invention are shown and described herein, it will be understood, of course, that the invention is not to be limited thereto since many modifications may be made, particularly by those skilled in this art, in light of this disclosure. It is contemplated, therefore, by the appended claims, to cover any such modifications as fall within the true spirit and scope of this invention.

We claim:

1. A variable reluctance electric motor comprising:
   a stator formed having a plurality of individual phase segments which are arranged in an annular array, the segments being provided with phase windings and stator pole teeth, said phase segments being connected with a stationary bearing race, and said pole teeth projecting in a generally radial direction and wherein said stator phase windings are vertically suspended underneath said bearing race of said stator; and
   a rotor formed integrally with a bearing race, said rotor being vertically supported by said stator by a plurality of bearing members, said rotor having a plurality of rotor pole teeth disposed adjacent said stator pole teeth, said rotor pole teeth being separated from said stator pole teeth by a first generally vertically extending gap.

2. A variable reluctance electric motor comprising:
   a stator formed having a plurality of individual phase segments which are arranged in an annular array, the segments being provided with phase windings and stator pole teeth, said phase segments being connected with a stationary bearing race, and said pole teeth projecting in a generally radial direction; and
   a rotor formed integrally with a bearing race, said rotor being vertically supported by said stator by a plurality of bearing members, said rotor having a plurality of rotor pole teeth disposed adjacent said stator pole teeth, said rotor pole teeth being separated from said stator pole teeth by a first generally vertically extending gap, and wherein said rotor has a core which is vertically suspended underneath said bearing race of said rotor.

3. An aimable ordinance platform for a defense vehicle powered by a variable reluctance electric motor comprising:
   a base connected with a stator formed having a plurality of individual phase segments which arm arranged in an annular array, the segments being provided with phase windings and stator pole teeth, said phase segments being connected with a stationary bearing race, and said pole teeth projecting in a generally radial direction, and herein said stator has a coil winding which is vertically supported underneath said bearing race of said stator; and
   a rotor formed integrally with a bearing race, said rotor being vertically supported by said stator by a plurality of bearing members, said rotor having a plurality of rotor pole teeth disposed adjacent said stator pole teeth, said rotor pole teeth being separated from said stator pole teeth by a first vertically extending gap.

4. An aimable ordinance platform for a defense vehicle powered by a variable reluctance electric motor comprising:
   a base connected with a stator formed having a plurality of individual phase segments which are arranged in an annular array, the segments being provided with phase windings and stator pole teeth, said phase segments being connected with a stationary bearing race, and said pole teeth projecting in a generally radial direction; and a rotor formed integrally with a bearing race, said rotor being vertically supported by said stator by a plurality of bearing members, said rotor having a plurality of rotor pole teeth disposed adjacent said stator pole tech, said rotor pole teeth being separated from said stator pole teem by a first vertically extending gap, and said rotor has a core which is vertically suspended underneath said race of said rotor.

5. A variable reluctance motor, comprising:

a stationary bearing race;

a rotatable bearing race;

a bearing member disposed between said stationary and rotatable bearing races;

a stator having a plurality of individual phase segments formed in an annular array, each segment of said plurality of individual phase Segments being separately coupled to said stationary bearing race and having a conductor disposed about said segment and each segment of said plurality of individual phase segments defining a plurality of stator pole teeth; and, a rotor coupled to and suspended from said rotatable bearing race, said rotor defining a plurality of radially extending rotor pole teeth opposing said stator pole teeth.

6. The variable reluctance motor of claim 5 wherein at least one segment of said plurality of individual phase segments is suspended from said stationary bearing race.

7. The variable reluctance motor of claim 6 wherein said at least one segment is vertically suspended underneath said stator bearing race.

8. The variable reluctance motor of claim 5 wherein said rotor is vertically suspended underneath said rotor bearing race.

9. The variable reluctance motor of claim 5 wherein at least one segment of said plurality of individual phase segments defines a first radially extending stator pole about which said conductor is disposed.

10. The variable reluctance motor of claim 9 wherein said at least one segment of said plurality of individual phase segments defines portions of second and third radially extending stator poles.

11. The variable reluctance motor of claim 5 wherein at least one segment of said plurality of individual phase segments is disposed on both a radially inner side or said rotor and a radially outer side of said rotor.

12. The variable reluctance motor of claim 11 wherein said stator pole teeth and said rotor pole teeth face each other across two concentric annular gaps.

13. The variable reluctance motor of claim 5 wherein at least one segment of said plurality of individual phase segments has a laminated core.

14. The variable reluctance motor of claim 5 wherein said rotor includes a plurality of laminations.

15. An aimable ordinance platform for a defense vehicle, comprising:

a stationary bearing race coupled to a hull of said defense vehicle;

a rotatable bearing race coupled to a turret of said defense vehicle;

a bearing member disposed between said stationary and rotatable bearing races; and, a variable reluctance motor comprising:

a stator having a plurality of individual phase segments formed in an annular array, each segment of said plurality of individual phase segments being separately coupled to said stationary bearing race and having a conductor disposed about said segment and each segment of said plurality of individual phase segments defining a plurality of stator pole teeth; and, a rotor coupled to and suspended from said rotatable bearing race, said rotor defining a plurality of radially extending rotor pole teeth opposing said stator pole teeth.

16. The aimable ordinance platform of claims 15 wherein at least one segment of said plurality of individual phase segments is suspended from said stationary bearing race.

17. The aimable ordinance platform of claims 16 wherein said at least one segment is vertically suspended underneath said stator bearing race.

18. The aimable ordinance platform of claims 15 wherein said rotor is vertically suspended underneath said rotor bearing race.

19. The aimable ordinance platform of claims 15 wherein at least one segment of said plurality of individual phase segments defines a first radially extending stator pole about which said conductor is disposed.

20. The aimable ordinance platform of claims 19 wherein said at least one segment of said plurality of individual phase segments defines portions of second and third radially extending stator poles.

21. The aimable ordinance platform of claims 15 wherein at least one segment of said plurality of individual phase segments is disposed on both a radially inner side of said rotor and a radially outer side of said rotor.

22. The aimable ordinance platform of claims 21 wherein said stator pole teeth and said rotor pole teeth face each other across two concentric annular gaps.

23. The aimable ordinance platform of claims 15 wherein at least one segment of said plurality of individual phase segments has a laminated core.

24. The aimable ordinance platform of claims 15 wherein said rotor includes a plurality of laminations.

* * * * *

UNITED STATES PATENT AND TRADEMARK OFFICE
CERTIFICATE OF CORRECTION

PATENT NO. : 6,717,312 B1
DATED : April 6, 2004
INVENTOR(S) : Martin Kaplan and Peter Senak, Jr.

It is certified that error appears in the above-identified patent and that said Letters Patent is hereby corrected as shown below:

<u>Column 4,</u>
Line 48, delete "arm" and substitute -- are -- therefor;

<u>Column 5,</u>
Line 20, delete "Segments" and substitute -- segments -- therefor.

Signed and Sealed this

First Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,717,312 B1
DATED : April 6, 2004
INVENTOR(S) : Martin Kaplan and Peter Senak, Jr.

It is certified that error appears in the above-identified patent and that said Letters Patent is hereby corrected as shown below:

<u>Column 4,</u>
Line 53, the word "herein" should be -- wherein --.

Signed and Sealed this

Fifth Day of April, 2005

JON W. DUDAS
*Director of the United States Patent and Trademark Office*